(12) United States Patent
Lu et al.

(10) Patent No.: US 12,235,438 B2
(45) Date of Patent: Feb. 25, 2025

(54) MEMS WAVELENGTH SELECTABLE SWITCH FOR ADAPTIVE WAVELENGTH FILTERING

(71) Applicant: Beijing Voyager Technology Co., Ltd., Beijing (CN)

(72) Inventors: Yue Lu, Mountain View, CA (US); Youmin Wang, Mountain View, CA (US)

(73) Assignee: Beijing Voyager Technology Co., Ltd., Beijing (CN)

(*) Notice: Subject to any disclaimer, the term of this patent is extended or adjusted under 35 U.S.C. 154(b) by 1065 days.

(21) Appl. No.: 17/095,705

(22) Filed: Nov. 11, 2020

(65) Prior Publication Data

US 2022/0146815 A1  May 12, 2022

(51) Int. Cl.
| | |
|---|---|
| *G02B 26/00* | (2006.01) |
| *G01S 7/481* | (2006.01) |
| *G01S 17/08* | (2006.01) |
| *G02B 19/00* | (2006.01) |
| *G02B 26/08* | (2006.01) |
| *G02B 26/10* | (2006.01) |
| *H05B 1/02* | (2006.01) |
| *H05B 3/00* | (2006.01) |

(52) U.S. Cl.
CPC .......... *G02B 26/007* (2013.01); *G01S 7/4816* (2013.01); *G01S 7/4817* (2013.01); *G01S 17/08* (2013.01); *G02B 19/0052* (2013.01); *G02B 26/0833* (2013.01); *G02B 26/10* (2013.01); *H05B 1/023* (2013.01); *H05B 3/0014* (2013.01)

(58) Field of Classification Search
CPC .......................... G02B 26/007; G02B 26/0833
See application file for complete search history.

(56) References Cited

U.S. PATENT DOCUMENTS

| | | |
|---|---|---|
| 8,077,372 B2 | 12/2011 | Border et al. |
| 8,854,597 B2 * | 10/2014 | Sharma .................. G02B 26/02 349/196 |
| 10,802,221 B1 | 10/2020 | Murano et al. |

(Continued)

FOREIGN PATENT DOCUMENTS

CN          104062267 A  *  9/2014

OTHER PUBLICATIONS

PCT/US2021/058475, "International Search Report and Written Opinion", Mar. 2, 2022, 11 pages.

(Continued)

*Primary Examiner* — Yuqing Xiao
*Assistant Examiner* — Clara G Chilton
(74) *Attorney, Agent, or Firm* — Kilpatrick Townsend & Stockton LLP

(57) ABSTRACT

A MEMS-based Wavelength Selectable Switch (WSS), used classically for demultiplexing fiber optic communications, is re-purposed to act as a filter. A light emitter provides a light beam with its wavelength detected by a wavelength detector. A light condenser directs reflected light from the light emitter to an input of the WSS. The WSS is controllable to provide a selected wavelength band to a selected output of the WSS, where it is detected by a photodetector. Other wavelengths are discarded by the WSS at other outputs. A controller is configured to control the WSS to select the selected wavelength band based on a detected wavelength from the wavelength detector.

6 Claims, 10 Drawing Sheets

(56) References Cited

U.S. PATENT DOCUMENTS

| | | | |
|---|---|---|---|
| 11,796,645 B1* | 10/2023 | Li | G01S 7/4817 |
| 2006/0067372 A1* | 3/2006 | Simler | H01S 3/102 |
| | | | 372/20 |
| 2007/0172240 A1* | 7/2007 | Terai | H04J 14/02 |
| | | | 398/83 |
| 2011/0164783 A1 | 7/2011 | Hays et al. | |
| 2012/0207477 A1 | 8/2012 | Takeguchi et al. | |
| 2013/0050697 A1 | 2/2013 | Colbourne et al. | |
| 2013/0142516 A1 | 6/2013 | Zhou | |
| 2016/0352448 A1 | 12/2016 | Zhou | |
| 2018/0081045 A1 | 3/2018 | Gylys et al. | |
| 2019/0028227 A1 | 1/2019 | Zhou | |
| 2019/0293794 A1 | 9/2019 | Zhang et al. | |
| 2019/0302238 A1 | 10/2019 | Mourujarvi | |
| 2020/0083660 A1* | 3/2020 | Luo | H01S 5/0612 |

OTHER PUBLICATIONS

Fosco Connect "What Is Wavelength Selective Switch—WSS?" pulled from the Internet on Sep. 15, 2020, https://www.fiberoptics4sale.com/blogs/archive-posts/95046534-what-is-wavelength-selective-switch-wss, dated Mar. 14, 2011, 16 pages.

* cited by examiner

MEMS WAVELENGTH SELECTABLE SWITCH FOR ADAPTIVE WAVELENGTH FILTERING

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc., and can be configured to perform both transmission and reception of light. For example, a light steering transmitter may include a micro-mirror to control the projection direction of light to detect/image an object. Moreover, a light steering receiver may also include a micro-mirror to select a direction of incident light to be detected by the receiver, to avoid detecting other unwanted signals. A micro-mirror assembly typically includes a micro-mirror and an actuator. In a micro-mirror assembly, a mirror-mirror can be connected to a substrate via a connection structure (e.g., a torsion bar, a spring, etc.) to form a pivot point. One such type of micro-mirror assembly can be a micro-electromechanical system (MEMS)-type structure that may be used for a light detection and ranging (LiDAR) system in an autonomous vehicle, which can be configured for detecting objections and determining their corresponding distances from the vehicle. LiDAR systems typically work by illuminating a target with an optical pulse and measuring the characteristics of the reflected return signal. The return signal is typically captured as a point cloud. The width of the optical-pulse often ranges from a few nanoseconds to several microseconds.

In a LiDAR system, solar light has a spectrum that overlaps with that of the laser emitter, and is typically the strongest noise source. Usually, a well-designed optical filter that matches the spectrum of the emitter laser helps to reject all of the out-of-band wavelength solar light. However for a LiDAR deployed on the vehicle, due to the various operation conditions, for example wide temperature range (typically from −40 C to 140 C) as required by vehicle regulation standards, the emitter laser wavelength is not a fixed constant. The laser wavelength shifts due to temperature changes, which causes refractive index changes of its active area gain material, and its etalon filter characteristics. To accommodate this wavelength shift, the filter is often set with a wider spectral range to guarantee no signal light from the laser is cut off. However this in return widens the solar noise acceptance range and compromises the overall signal to noise ratio (SNR).

BRIEF SUMMARY OF THE INVENTION

Techniques disclosed herein relate generally to microelectromechanical (MEMS) mirrors that can be used in, for example, light detection and ranging (LiDAR) systems or other light beam steering systems. More specifically, and without limitation, disclosed herein are apparatus and methods for measuring the output wavelength and effectively adjusting a filtered bandwidth in real time.

According to certain embodiments, a MEMS-based Wavelength Selectable Switch (WSS) (used classically for demultiplexing fiber optic communications) is re-purposed to act as a filter. A light emitter provides a light beam with its wavelength detected by a wavelength detector. A light condenser directs reflected light from the light emitter to an input of the WSS. The WSS is controllable to provide a selected wavelength band to a selected output of the WSS, where it is detected by a photodetector. Other wavelengths are discarded by the WSS at other outputs. A controller is configured to control the WSS to select the selected wavelength band based on a detected wavelength from the wavelength detector.

According to certain embodiments, the WSS filter is integrated into a micro-electromechanical system (MEMS) apparatus for beam steering in a Light Detection and Ranging (LiDAR) system of an autonomous vehicle. The light emitter is a laser diode which emits a laser beam. A laser beam wavelength detector provides information to allow determining the wavelength of the laser beam. The controller is configured to control the WSS to select the selected wavelength band based on detected wavelength information from the laser beam wavelength detector. In one embodiment, the selected wavelength band of the WSS is 25 nanometers or less, providing a filtering function to limit the amount of light noise detected and improving the signal-to-noise ratio.

In one embodiment, a heater is mounted proximate to the laser diode. A thermistor is mounted proximate to the laser diode. The controller is coupled to the heater to cause the heater to maintain a temperature output of the thermistor to above a designated temperature level that will maintain the wavelength of the laser beam within the selected wavelength band. The controller provides a varying voltage level to the resistor to maintain the temperature output of the thermistor to above the designated temperature level. In one embodiment, heater is at least one resistor. Thus, the range of variation of the laser wavelength is limited, allowing an even narrower passband to be established by the WSS.

In certain embodiments, a method is provided for filtering reflected light with a wavelength selectable switch. A light beam is emitted from a light emitter, and its wavelength is detected. Reflected light from the light emitter is directed to an input of a MEMS-based Wavelength Selectable Switch (WSS). The WSS is controlled to provide a selected wavelength band to a selected output of the WSS. A photodetector detects the intensity of the selected wavelength band from the selected output of the WSS. The WSS is controlled to select the selected wavelength band based on detecting the wavelength of the light beam.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which.

DETAILED DESCRIPTION OF THE INVENTION

Figure 1:
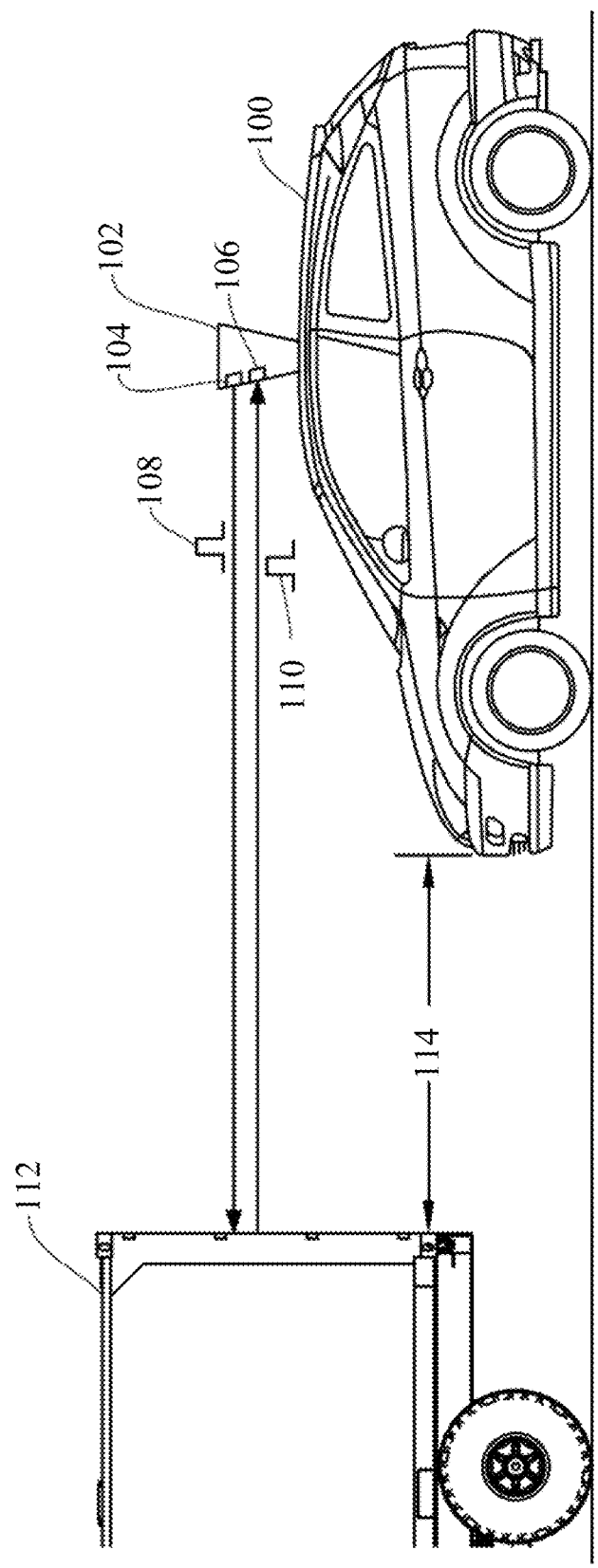
FIG. 1 shows an autonomous vehicle with a LiDAR system, according to certain embodiments.

Aspects of the present disclosure relate generally to using a MEMS-based Wavelength Selectable Switch (WSS) as a variable bandwidth filter, and more particularly to a LiDAR system that scans an environment with a laser and MEMS-based mirror arrays.

In the following description, various examples of a Wavelength Selectable Switch and MEMS-based micro mirror structures and are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Techniques disclosed herein relate generally to microelectromechanical (MEMS) mirrors that can be used in, for example, light detection and ranging (LiDAR) systems or other light beam steering systems. More specifically, and without limitation, disclosed herein is a MEMS-based Wavelength Selectable Switch (WSS), used classically for demultiplexing fiber optic communications, which is re-purposed to act as a filter. A light emitter provides a light beam with its wavelength detected by a wavelength detector. A light condenser directs reflected light from the light emitter to an input of the WSS. The WSS is controllable to provide a selected wavelength band to a selected output of the WSS, where it is detected by a photodetector. Other wavelengths are discarded by the WSS at other outputs. A controller is configured to control the WSS to select the selected wavelength band based on a detected wavelength from the wavelength detector. Since the output wavelength of the laser is detected, it can be used to change the effective passband of the WSS so that the detected wavelength is in the middle of the passband. In one embodiment, the selected wavelength band of the WSS is 25 nanometers or less (e.g., 20 nm), providing a filtering function to limit the amount of light noise detected and improving the signal-to-noise ratio.

In one embodiment, the wavelength band to be detected is further controller at the laser diode. A heater is mounted proximate to the laser diode. A thermistor is mounted proximate to the laser diode to detect the temperature of the laser diode. Since the wavelength varies with temperature according to a known calibration, the controller can receive a feedback temperature, and apply it to a look-up table to determine the corresponding wavelength. The controller is coupled to the heater to cause the heater to maintain a temperature output of the detected by the thermistor to above a designated temperature level that will maintain the wavelength of the laser beam within the selected wavelength band. The controller provides a varying voltage level to the heater, which may simply be one or more resistors, to maintain the temperature of the laser to above the designated temperature level. This allows the controller to set the passband of the WSS so that the wavelength is not in the middle, but rather is near the low end of the passband, since any changes with temperature will be higher temperatures, which will result in a higher wavelength, not a lower one.

Typical Lidar System Environment for Certain Embodiments of the Invention

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, a frequency modulated continuous wave (FMCW) signal, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
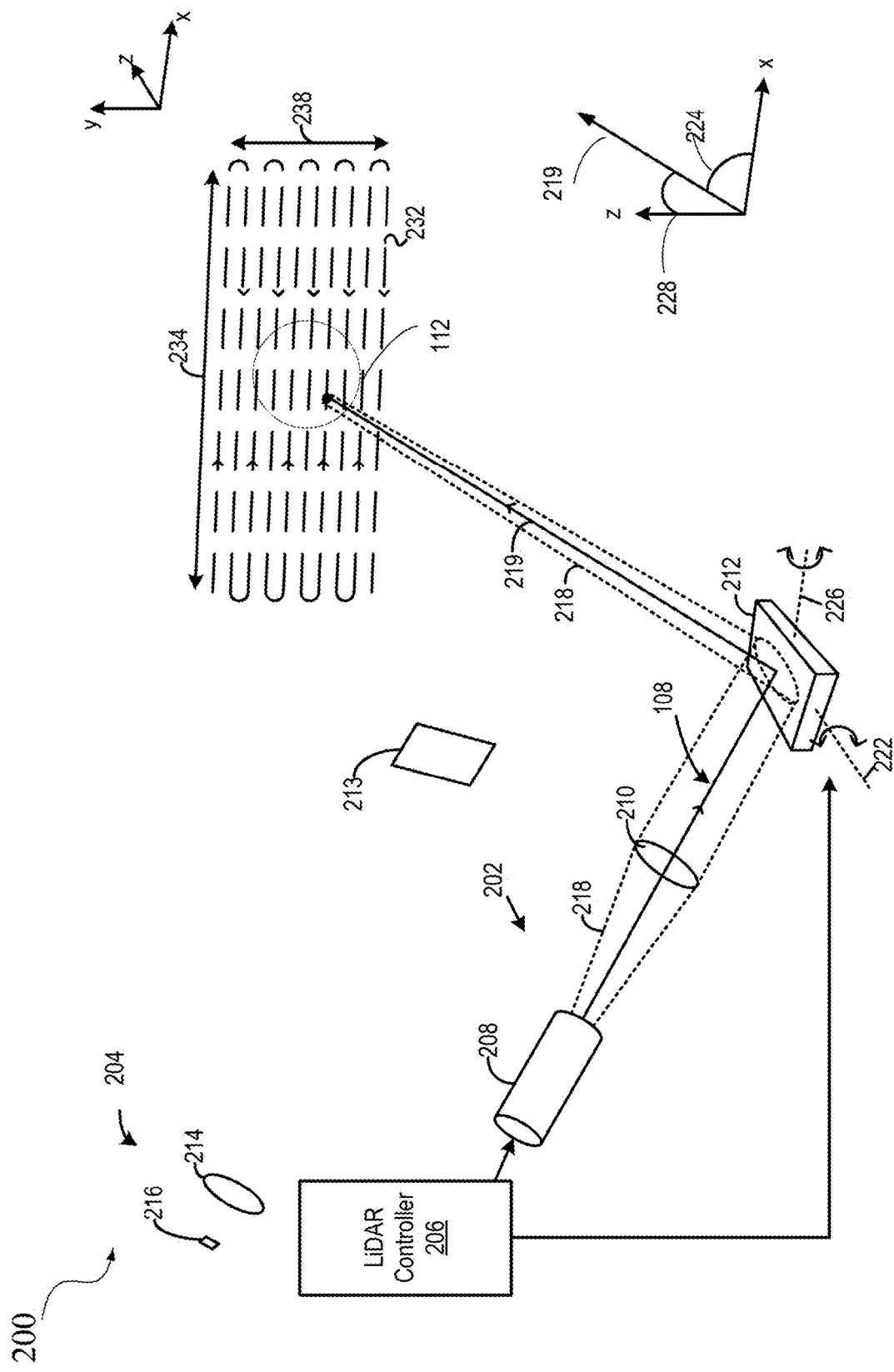
FIG. 2A shows an example of a light projection operation, according to certain embodiments.
Figure 2B:
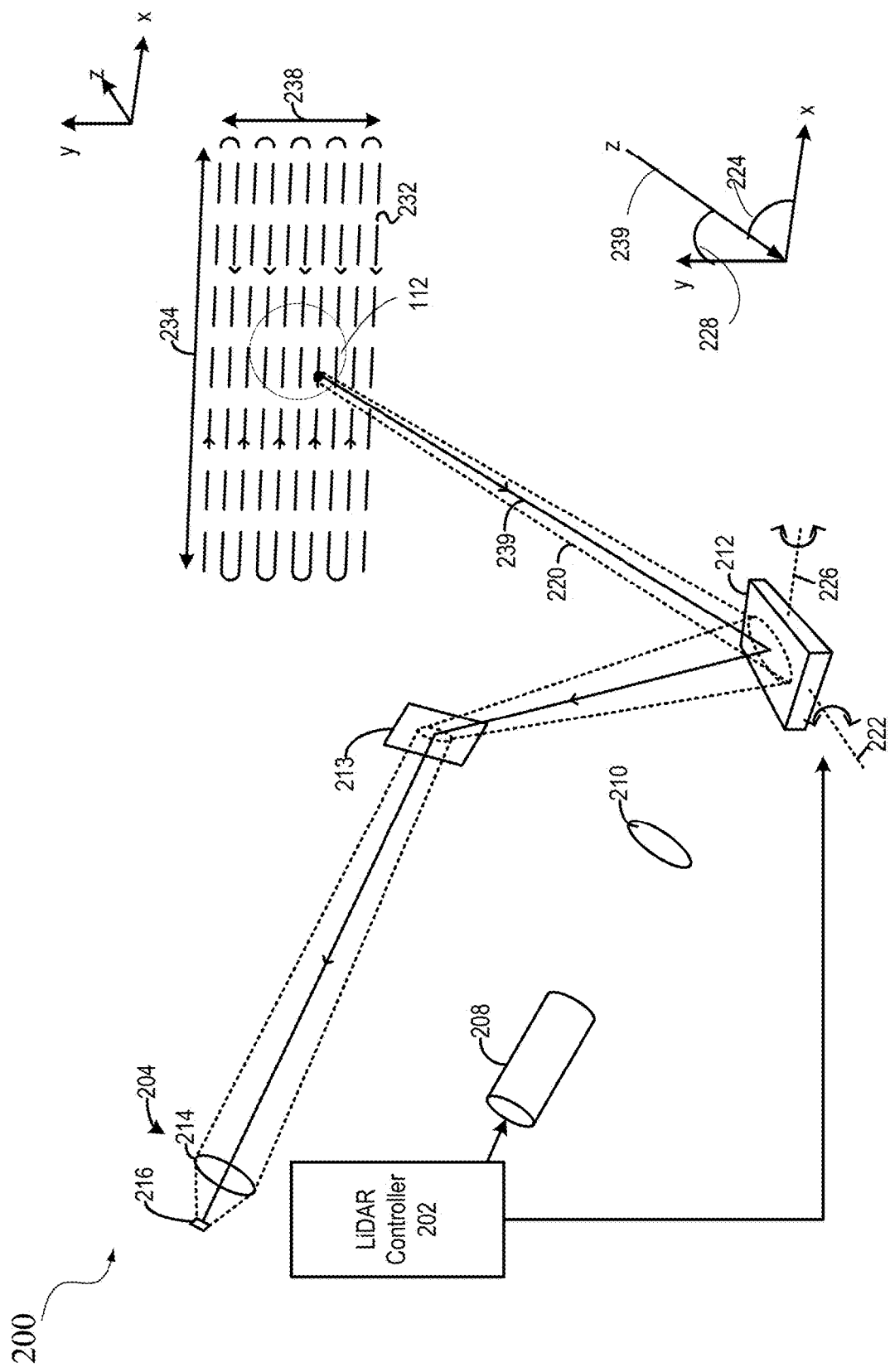
FIG. 2B shows an example of a light detection operation, according to certain embodiments.

FIGS. 2A and FIG. 2B illustrate simplified block diagrams of an example of a LiDAR module 200 according to certain embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a light projection operation, according to certain embodiments. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204 and detected by the LiDAR module, as further described below with respect to FIG. 2B. In certain embodiments, mirror assembly 212 can include one or more comb spines with comb electrodes (see, e.g., FIG. 3), as will be described in further detail below.

FIG. 2B shows an example of a light detection operation, according to certain embodiments. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

MEMS Wavelength Selectable Switch for Adaptive Wavelength Filtering

Embodiments of the invention provide a MEMS wavelength selectable switch (WSS) based optical wavelength filtering system. A WSS is used in prior art fiber optic telecommunications systems to multiplex different wavelengths, with each wavelength/frequency carrying a different communication signal. Embodiments of the present invention repurpose such a WSS to perform a filtering function to eliminate noise signals in a Lidar system.

Figure 3:
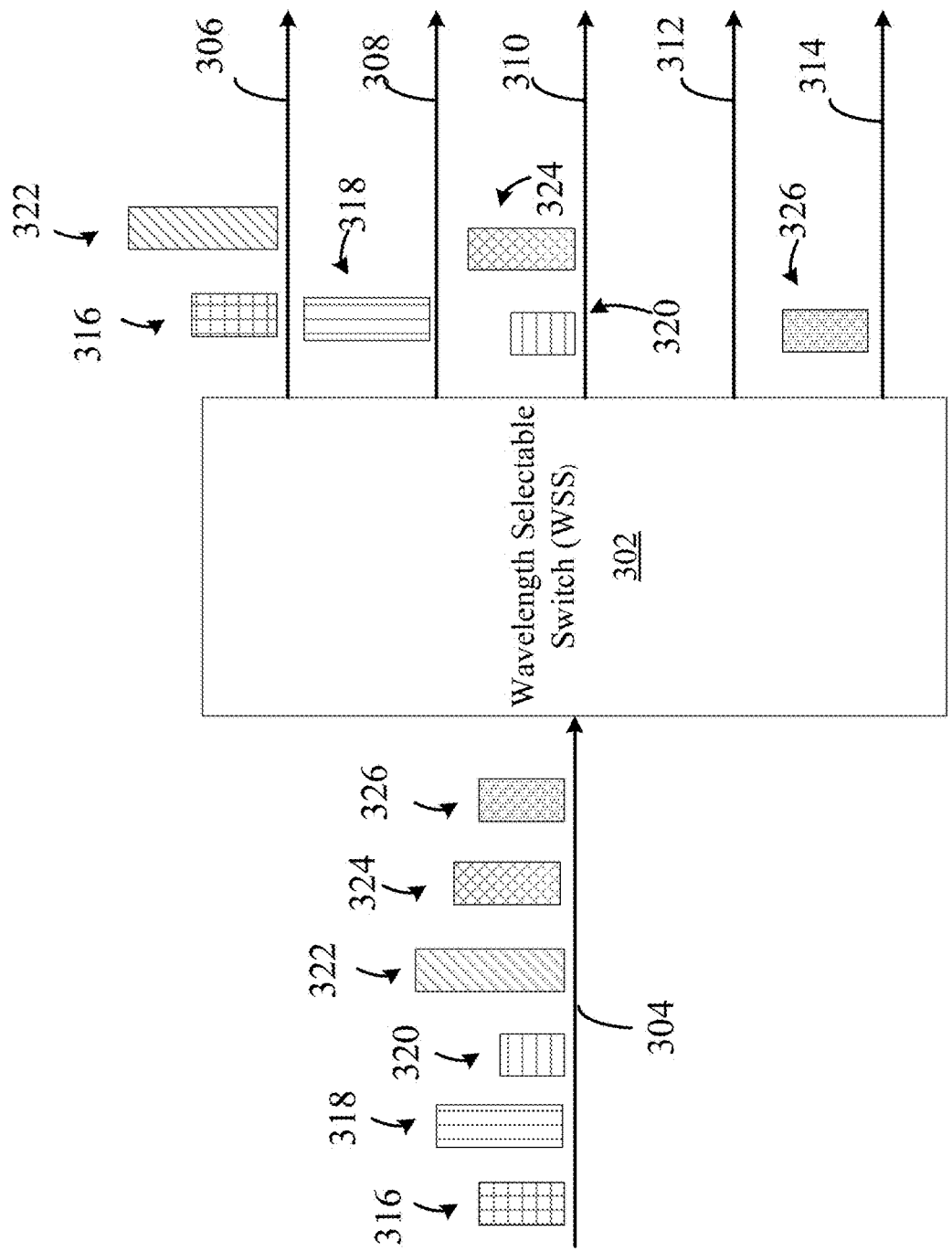
FIG. 3 is a diagram illustrating the concept of a wavelength selectable switch.

FIG. 3 is a diagram illustrating the concept of a wavelength selectable switch (WSS). FIG. 3 illustrates the concept of WSS: light mixed with various spectrum information being split into multiple channels based upon wavelength features. WSS 302 is essentially a demultiplexer. Signals on incoming line 304 are demultiplexed into signals on output lines 306, 308, 310, 312 and 314. Shown are various wavelength light signals 316, 318, 320, 322, 324 and 326 arriving on input 304. The intensity of each wavelength can vary as illustrated by the varying sizes illustrated. The wavelength selectable switch 302 then demultiplexes these optical signals as programmed. In the example shown, wavelengths 316 and 322 are both provided on output 306. Wavelength 318 is provided on output 308. Wavelengths 320 and 324 are provided on output 310. No wavelength is provided an output 312, because it is either not used or no appropriate wavelength arrived on input 304. Wavelength 326 is provided on output 314. This wavelength switching (routing) process can be dynamically changed through an electronic communication control interface on the WSS.

As applied to embodiments of the present invention, the incoming light back from the object is a mixture of laser signal and solar noise. The front end laser wavelength detector provides the exact laser wavelength information. A signal band is selected and delivered to the detector port, while all the out-of-band wavelength light are selected out and delivered to a dump band.

Figure 4:
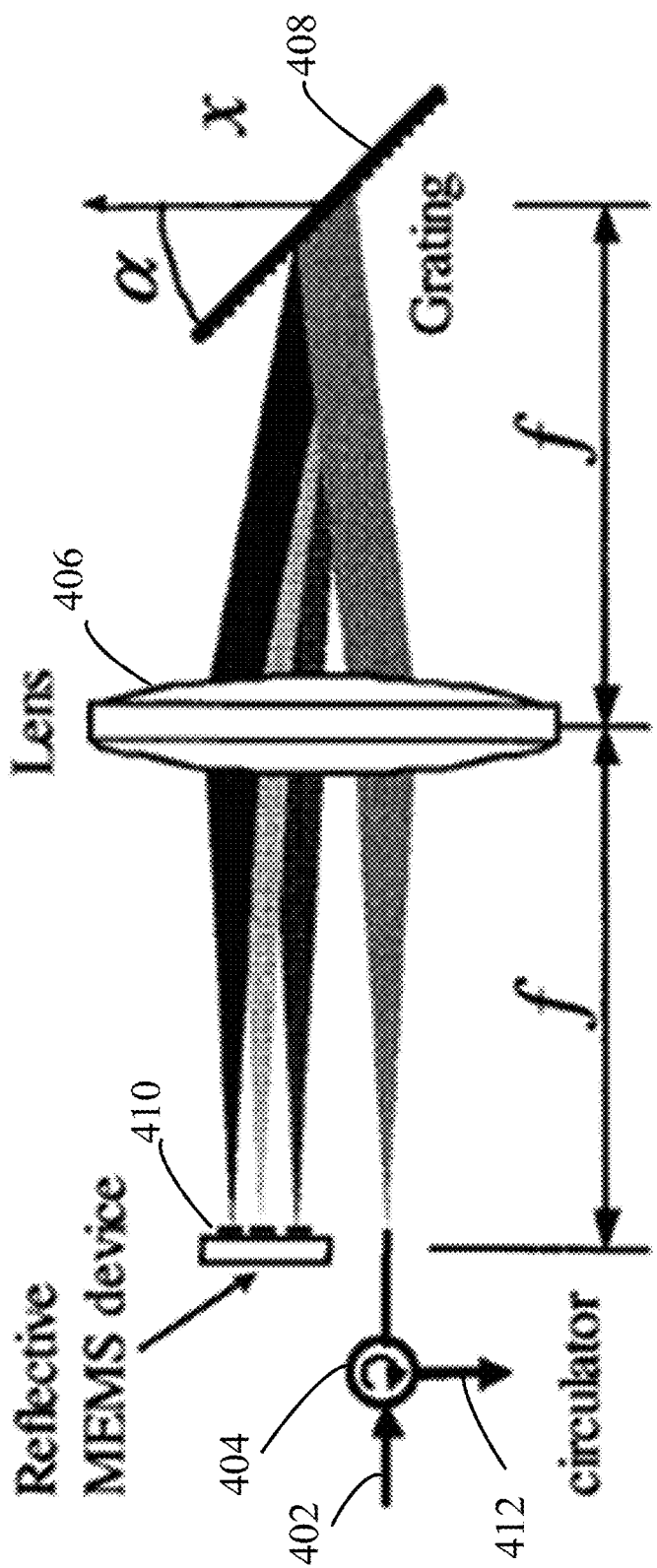
FIG. 4 is a diagram a wavelength selectable switch.

FIG. 4 is a diagram of a MEMS-based a wavelength selectable switch. Incoming back scattered light off of an object is first coupled into an optical fiber 402, then coupled through an optical circulator 404, which directs it via a fiber-optic output to a lens 406. Coming out of the optical circulator 404, the light is first collimated with a 2-f lens system 406, shining onto a grating (or prism element) 408 for wavelength dispersion. The dispersion of the reflected light is wavelength-demultiplexing, accomplished by diffraction off the grating 408 The desired wavelength light for different bands impacts different mirrors in MEMS mirror array 410. This is accomplished by the diffraction grating separately reflecting different wavelength bands back through the 2-f lens system 406, re-focusing onto a reflective MEMS array device 410 which sits on the focal plane of the lens 406. The selected wavelength band is reflected back by the MEMS device 410 and re-collimated by the lens 406, tracing back through the grating 408 and fiber collimating lens 406 again, eventually focused back into the fiber to circulator 404. Inside the fiber the light passes through the circulator 404 and is directed through an output port 412 to a photodetector. In a fiber optics communication system, multiple fibers and circulators are used to provide the different outputs 306-314 illustrated in FIG. 3.

The output light is separated from the input light by circulator 404, and finally the lens couples the light back into the fiber. An optical circulator is typically a multiple (three- or four) port optical device designed such that light entering any port exits from the next. This means that if light enters port 1 it is emitted from port 2, but if some of the emitted light is reflected back to the circulator, it does not come out of port 1 but instead exits from port 3. This is analogous to the operation of an electronic circulator. Fiber-optic circulators are used to separate optical signals that travel in opposite directions in an optical fiber, for example to achieve bi-directional transmission over a single fiber. Because of their high isolation of the input and reflected optical powers and their low insertion loss, optical circulators are widely used in advanced communication systems and fiber-optic sensor applications. Optical circulators are based on the nonreciprocal polarization rotation of the Faraday effect. A common material used in the construction of optical circulators is the birefringent crystal.

The direction of the beam after the grating 408 in the WSS will depend on the wavelength of the beam. The diffracted beams then pass through the lens for a second time, and the spectrally resolved light is focused on the reflective MEMS mirror array. The MEMS mirror array then either changes the amplitude (attenuates) or the direction of the beam. In other words, the incoming light is broken into a spectrum of wavelength bands by the diffraction grating and each wavelength band then focuses on a separate MEMS mirror or group of mirrors. By tilting the mirror in one dimension, the band can be directed back into any of multiple demultiplexing fibers. A second tilting axis allows transient crosstalk to be minimized, otherwise switching (e.g., from port 1 to port 3) will always involve passing the beam across port 2. The second axis provides a means to attenuate the signal without increasing the coupling into neighboring fibers. This technology has the advantage of a single steering surface, not necessarily requiring polarization diversity optics. It works well in the presence of a continuous signal, allowing the mirror tracking circuits to dither the mirror and maximize coupling.

Figure 5:
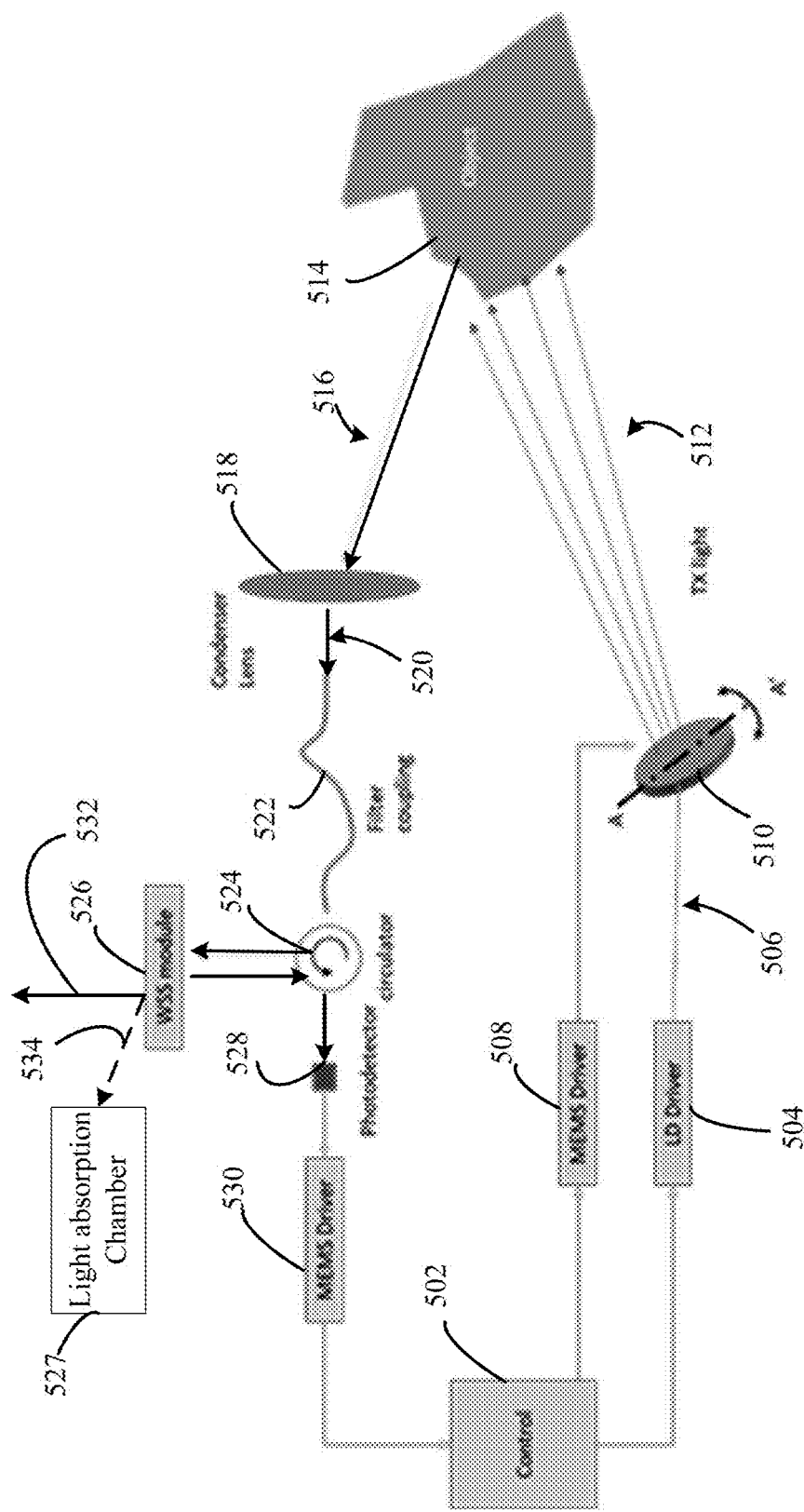
FIG. 5 is a diagram of a LIDAR system with a wavelength selectable switch according to embodiments.

FIG. 5 is a diagram of a LIDAR system uniquely incorporating a wavelength selectable switch according to embodiments. A controller 502 controls a laser diode and driver 504 to emit a laser beam 506. A MEMS driver 508 is controlled by controller 502 to drive the direction of a mirror array 510 to scan laser beam 506 across an object to be detected 514 as a series of scan line laser beams 512. The reflected beams 516 are condensed and focused by a condensing lens 518 as a reflected beam 520 into a fiber optic cable 522. Fiber cable 522 connects to a circulator 524, which provides the light to a WSS module 526. The desired light is reflected back, as discussed earlier, to circulator 524, which then provides the selected light through another output port to photodetector 528.

Controller 502 also controls a MEMS driver 530, which controls the MEMS array in WSS module 526 as described in preceding figures. However, instead of directing the different bands of demultiplexed light into different circulators and fiber optics, the undesired light is simply dumped. There are two options for doing this. One is to simply eject the light 532 back out into the atmosphere. A second option is to redirect light into a light absorption chamber 527, such as a chamber entirely coated in black (a black light dump) to absorb in the light and keep it from being reflected back into the WSS module.

Figure 6:
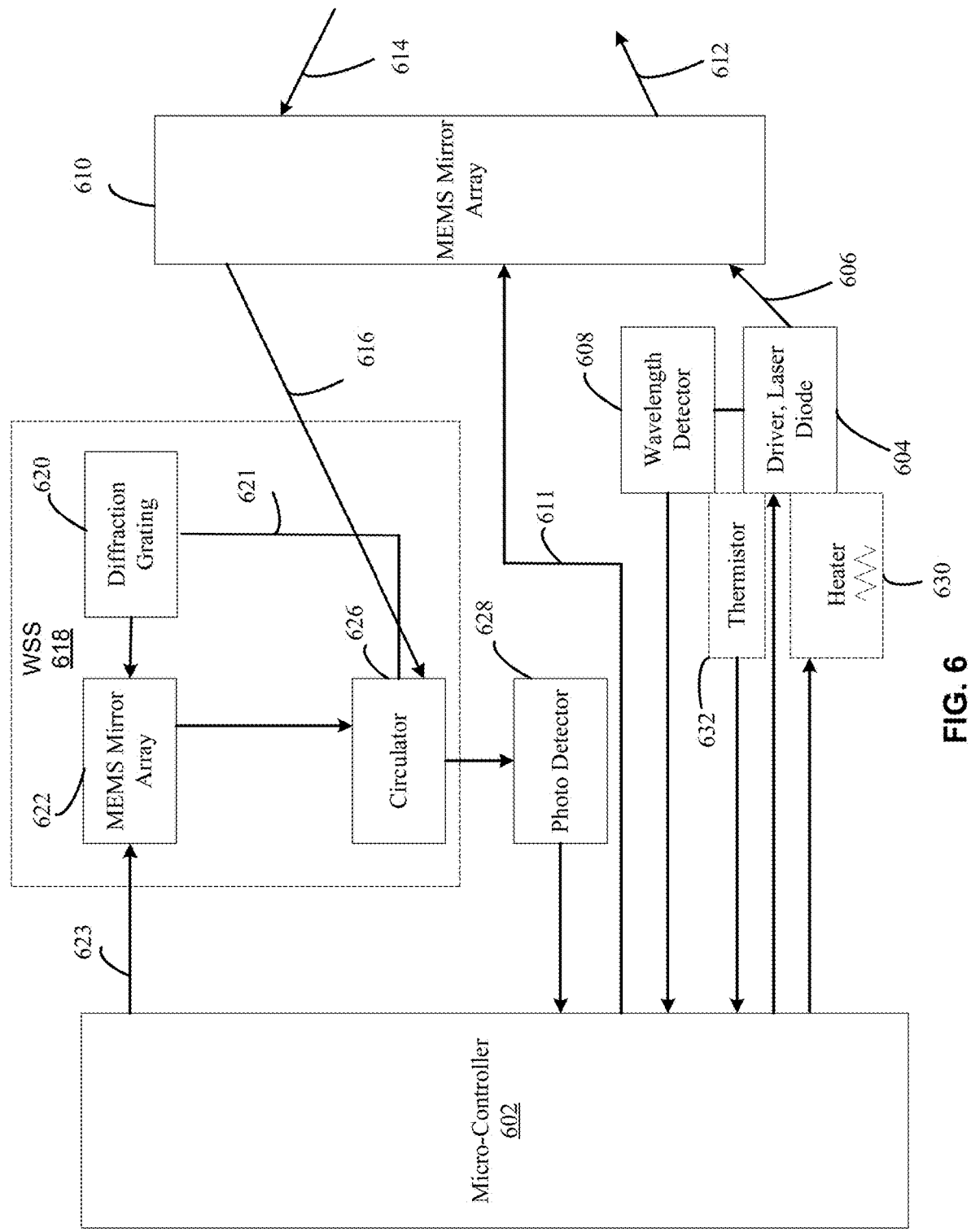
FIG. 6 is a diagram illustrating an embodiment of a control system according to the invention.

FIG. 6 is a diagram illustrating an embodiment of a control system according to the invention. As shown, a microcontroller 602 drives a driver and laser diode 604 which provides a laser beam 606 to a MEMS mirror array 610. MEMS mirror array 610 scans an output laser beam 612 to provide raster scanning of the environment to be detected. The reflected beams 614 are provided the same MEMS array 610, or a different MEMS mirror array, and then are redirected as beam 616 to the WSS module 618. In particular, the reflected beams are directed to circulator 626, then via fiber optic 621 to diffraction grating 620, which is then provided via the lens system (not shown) to MEMS mirror array 622. MEMS mirror array 622 is controlled by microcontroller 602 to direct the desired wavelength to circulator 620. The circulator does not need additional control, it is already in nature directional. The output of the circulator 626 is provided to photodetector 628, which provides its output to microcontroller 602.

Microcontroller 602 through control line 611 controls element 610 to direct the emitted and reflected laser beams as described. Element 610 can be any type of scanner, single mirror, MEMS mirror array, or even mechanical scanners. In addition, on control line 623 it directs the MEMS mirror array 622 in WSS module 618 to direct the desired wavelength band back to circulator 626 and photodetector 628. The desired band is determined using a wavelength detector 608 which provides a signal back to microcontroller 602 indicating the wavelength of laser diode 604. In one embodiment, an interferometer is used to measure the wavelength of laser diode 604. The interferometer could be a Scanning Michelson Interferometer or a Static Fizeau Interferometer, for example. In another embodiment, the wavelength detector is a thermistor which provides a temperature of the laser diode back to the microcontroller. Microcontroller 602 then consults a table determining the effect of different temperatures on the wavelength of laser diode 604 and calculating the current wavelength for the current temperature condition.

Based on this determination of the laser wavelength, the controller can select a new band corresponding to the current wavelength at the current temperature and direct MEMS mirror array 622 to select that band for direction back to circulator 626 and photodetector 628. As described earlier, the other, undesired bands on other ports of WSS 618 are discarded. They can be discarded by dumping them into a nonreflective absorption chamber or back out into the environment.

Thus, instead of the prior art use of demultiplexing particular wavelength communication bands, the WSS is used to select in real time a changing wavelength band corresponding to the emitted wavelength band as it changes with temperature. In effect, the WSS demultiplexer is converted into a real-time programmable bandpass filter. Due to the precise control enabled, a fairly narrow wavelength band can be selected, so that WSS 618 discards other wavelengths which typically correspond to environmental noise or ambient light. Thus, this provides an alternative to a bandpass filter which would be required to be passing a fairly wide band, including noise, in order to accommodate the changes in the emitted wavelength with temperature changes.

In embodiments, a 905 nm wavelength laser diode is used. For one type of laser diode, for every 10 degrees Centigrade, temperature change, there is a 6 nm wavelength change, with the wavelength increasing with temperature. Thus, systems using a bandpass filter would need to pass a 60 nm band, from 875-935, to accommodate a temperature variation of +/−50 degrees. With embodiments of the present invention, a relatively narrow band of +/−5 or +/−10 nm, for example, can be set. In one embodiment, a passband of 25 nm or less is set, such as 20 nm. In one embodiment, a passband of 20-60 nm is provided. This narrower band is not limited to +/−50 degrees, and can track even greater temperature variations, while maintaining a narrow band around the emitted wavelength.

In some embodiments, an optional heater 630 is added, proximate to laser diode 604. The heater is used to maintain a minimum heat at laser diode 604, so that variations in wavelength with temperature are only in one direction. An optional thermistor 632 measures the temperature of the laser, and provides that value to microcontroller 602. Microcontroller 602 causes the heater 630 to heat laser diode 604 until a desired, threshold temperature is reached. When that temperature is exceeded, the heater is turned off. In one embodiment, the heater is at least one resistor.

In embodiments, a larger aperture size can be used to collect more signal light, since the narrow bandwidth selection allows elimination of most ambient noise light. The aperture is the opening of the chip package containing the detector. The mirror size can range from hundreds of microns to less than one millimeter.

In an alternate embodiment, a MEMS shutter could be used in the WSS instead of mirrors. The MEMS shutter has areas that are controlled to be in a refractive state or transparent state, with the desired band being directed to the area in a transparent state. Thus, the system becomes a transmissive system, eliminating the need to redirect reflected light back through a lens system and diffractive grating. In one embodiment, a micro shutter array is similar to a MEMS mirror array, except that there is no mirror on the rotating substrate. Rather, the rotating substrate is rotated to 90 degrees to be transmissive, and stays flat (0 degrees) to block light. Alternately, rather than a mechanical shutter, an electro-optical shutter can be used, with liquid crystal shutters.

Figure 7:
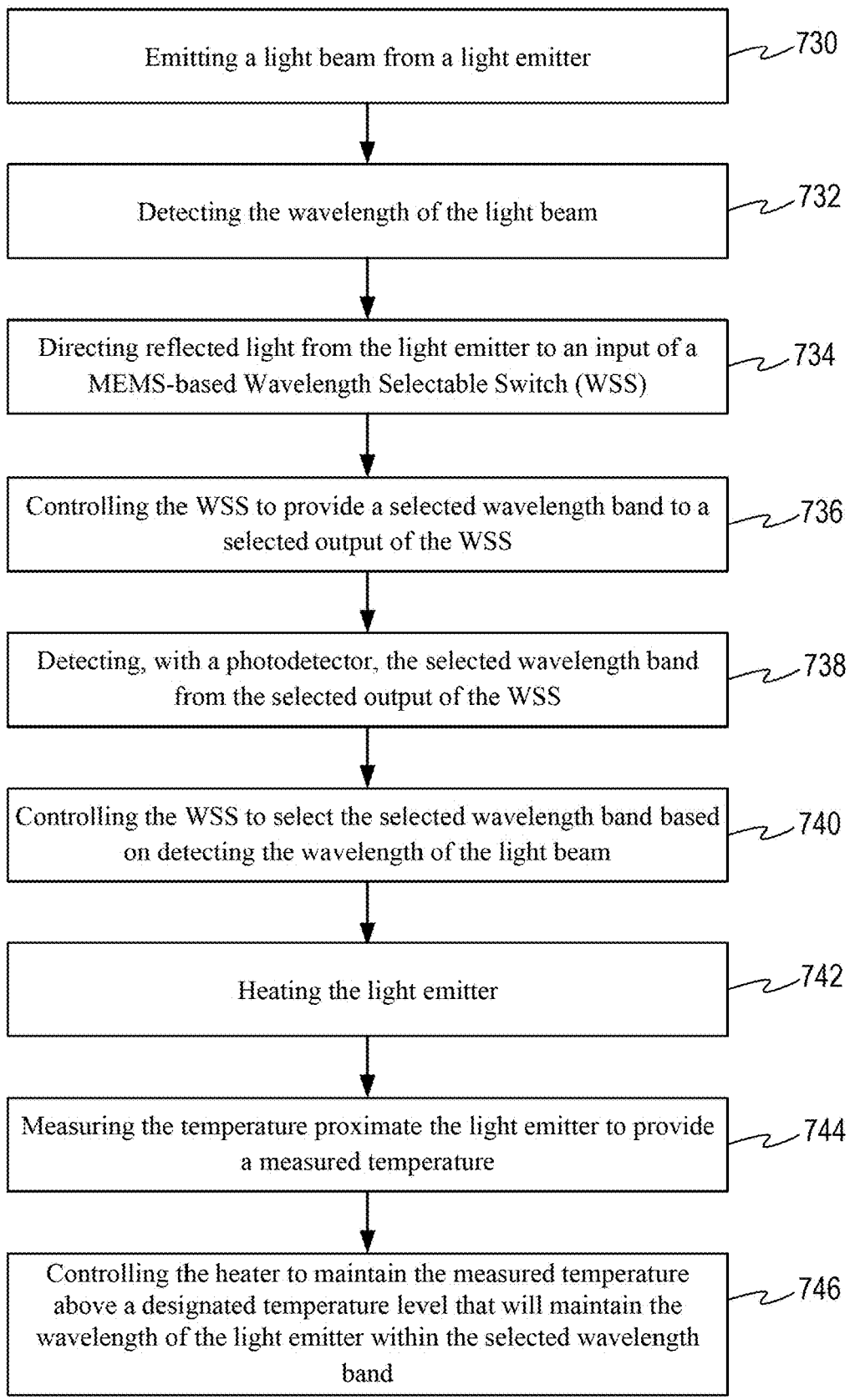
FIG. 7 is a flow chart of a method for filtering reflected light with a wavelength selectable switch according to embodiments.

FIG. 7 is a flow chart of a method for filtering reflected light with a wavelength selectable switch according to embodiments. In step 730, a light beam is emitted from a light emitter. Step 732 is detecting the wavelength of the light beam. Step 734 is directing reflected light from the light emitter to an input of a MEMS-based Wavelength Selectable Switch (WSS). Step 736 is controlling the WSS to provide a selected wavelength band to a selected output of the WSS. Step 738 is detecting, with a photodetector, the selected wavelength band from the selected output of the WSS. Step 740 is controlling the WSS to select the selected wavelength band based on detecting the wavelength of the light beam.

In some embodiments, additional steps 742-746 are performed to control the temperature, and thus the wavelength range, of the emitted light. Step 742 is heating the light emitter. Step 744 is measuring the temperature proximate the light emitter to provide a measured temperature. Step 746 is controlling the heater to maintain the measured temperature above a designated temperature level that will maintain the wavelength of the light emitter within the selected wavelength band.

In summary, embodiments provide a micro-electromechanical system (MEMS) apparatus for beam steering in a Light Detection and Ranging (LiDAR) system 102 of an autonomous vehicle 100. A laser diode 604 emits a laser beam 606. A laser beam wavelength detector 608 provides information to allow determining the wavelength of the laser beam 606. A MEMS-based Wavelength Selectable Switch (WSS) 618 is controllable to provide a selected wavelength band to an output of the WSS. A light condenser 518 directs reflected light from the laser diode to an input of the MEMS-based Wavelength Selectable Switch 618. At least one detector 628 detects the selected wavelength band from the output of the WSS. A controller 602 is configured to control the WSS to select the selected wavelength band based on detected wavelength information from the laser beam wavelength detector 608. In one embodiment, the selected wavelength band of the WSS is 25 nanometers or less, providing a filtering function to limit the amount of light noise detected and improving the signal-to-noise ratio.

In one embodiment, a heater 630 is mounted proximate to the laser diode. A thermistor 632 is mounted proximate to the laser diode. The controller 602 is coupled to the heater 630 to cause the heater to maintain a temperature output of the thermistor 632 to above a designated temperature level that will maintain the wavelength of the laser beam within the selected wavelength band. The controller provides a varying voltage level to the resistor to maintain the temperature output of the thermistor to above the designated temperature level. In one embodiment, heater 630 is at least one resistor.

Example LiDAR System Implementing Aspects of Embodiments Herein

Figure 8:
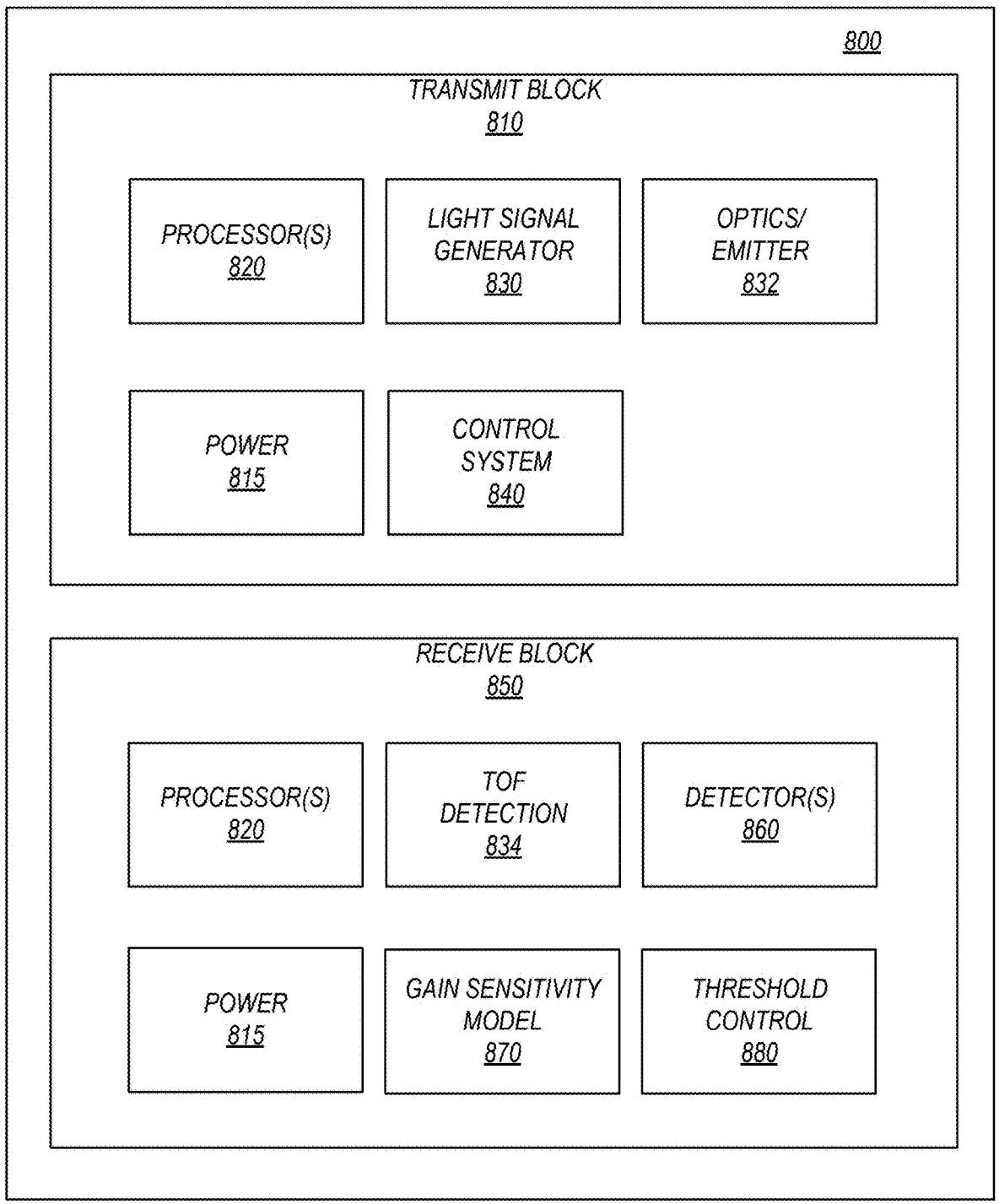
FIG. 8 illustrates a simplified block diagram showing aspects of a LiDAR-based detection system, according to certain embodiments of the invention.

FIG. 8 illustrates a simplified block diagram showing aspects of a LiDAR-based detection system 800 incorporating the WSS filtering functon described above, according to certain embodiments. System 800 may be configured to transmit, detect, and process LiDAR signals to perform object detection as described above with regard to LiDAR system 100 described in FIG. 1. In general, a LiDAR system 800 includes one or more transmitters (e.g., transmit block 810) and one or more receivers (e.g., receive block 850). LiDAR system 800 may further include additional systems that are not shown or described to prevent obfuscation of the novel features described herein.

Transmit block 810, as described above, can incorporate a number of systems that facilitate that generation and a emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 8, transmit block 810 can include processor(s) 820, light signal generator 830, optics/emitter module 832, power block 815 and control system 840. Some of all of system blocks 820-840 can be in electrical communication with processor(s) 820.

In certain embodiments, processor(s) 820 may include one or more microprocessors (μCs) and can be configured to control the operation of system 800. Alternatively or additionally, processor 820 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 800. For example, control system block 840 may include a local processor to certain control parameters (e.g., operation of the emitter). Processor(s) 820 may control some or all aspects of transmit block 810 (e.g., optics/emitter 832, control system 840, dual sided mirror 220 position as shown in FIG. 1, position sensitive device 250, etc.), receive block 850 (e.g., processor(s) 820) or any aspects of LiDAR system 800. Processor(s) 820 also determine, from a detected laser wavelength, the wavelength band to provide to the WSS in one embodiment. In some embodiments, multiple processors may enable increased performance characteristics in system 800 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 830 may include circuitry (e.g., a laser diode) configured to generate a light signal, which can be used as the LiDAR send signal, according to certain embodiments. In some cases, light signal generator 830 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 832 (also referred to as transmitter 832) may include one or more arrays of mirrors (including but not limited to dual sided mirror 220 as described above in FIGS. 1-6) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 832 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 815 can be configured to generate power for transmit block 810, receive block 850, as well as manage power distribution, charging, power efficiency, and the like. In some embodiments, power management block 815 can include a battery (not shown), and a power grid within system 800 to provide power to each subsystem (e.g., control system 840, etc.). The functions provided by power management block 815 may be subsumed by other elements within transmit block 810, or may provide power to any system in LiDAR system 800. Alternatively, some embodiments may not include a dedicated power block and power may be supplied by a number of individual sources that may be independent of one another.

Control system 840 may control aspects of light signal generation (e.g., pulse shaping), optics/emitter control, TOF timing, or any other function described herein. In some cases, aspects of control system 840 may be subsumed by processor(s) 820, light signal generator 830, or any block within transmit block 810, or LiDAR system 800 in general.

Receive block 850 may include circuitry configured to detect and process a return light pulse to determine a distance of an object, and in some cases determine the dimensions of the object, the velocity and/or acceleration of the object, and the like. This block includes the WSS describe above. Processor(s) 1065 may be configured to perform operations such as processing received return pulses from detectors(s) 860, controlling the operation of TOF module 834, controlling threshold control module 880, or any other aspect of the functions of receive block 850 or LiDAR system 800 in general. Processor(s) 1065 also control the mirror array, or transmissive array, in the WSS as described above.

TOF module 834 may include a counter for measuring the time-of-flight of a round trip for a send and return signal. In some cases, TOF module 834 may be subsumed by other modules in LiDAR system 800, such as control system 840, optics/emitter 832, or other entity. TOF modules 834 may implement return "windows" that limit a time that LiDAR system 800 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 834 may operate independently or may be controlled by other system block, such as processor(s) 820, as described above. In some embodiments, transmit block may also include a TOF detection module. One of ordinary skill in the art with the benefit of this disclosure would appreciate the many modification, variations, and alternative ways of implementing the TOF detection block in system 800.

Detector(s) 860 may detect incoming return signals that have reflected off of one or more objects. In some cases, LiDAR system 800 may employ spectral filtering based on wavelength, polarization, and/or range to help reduce interference, filter unwanted frequencies, or other deleterious signals that may be detected. Typically, detector(s) 860 can detect an intensity of light and records data about the return signal (e.g., via coherent detection, photon counting, analog signal detection, or the like). Detector (s) 860 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 870 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 870 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger, Cook-Torrence, Diffuse BRDF, Limmel-Seeliger, Blinn-Phong, Ward model, HTSG model, Fitted Lafortune Model, or the like. One of ordinary skill in the art with the benefit of this disclosure would understand the many alternatives, modifications, and applications thereof.

Threshold control block 880 may set an object detection threshold for LiDAR system 800. For example, threshold control block 880 may set an object detection threshold over a certain a full range of detection for LiDAR system 800. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 800, as would be understood by one of ordinary skill in the art. For example, system 800 may include a bus system (e.g., CAMBUS) to transfer power and/or data to and from the different systems therein. In some embodiments, system 800 may include a storage subsystem (not shown). A storage subsystem can store one or more software programs to be executed by processors (e.g., in processor(s) 820). It should be understood that "software" can refer to sequences of instructions that, when executed by processing unit(s) (e.g., processors, processing devices, etc.), cause system 800 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 800 may include aspects of gain sensitivity model 870, threshold control 880, control system 840, TOF module 834, or any other aspect of LiDAR system 800.

It should be appreciated that system 800 is meant to be illustrative and that many variations and modifications are possible, as would be appreciated by one of ordinary skill in the art. System 800 can include other functions or capabilities that are not specifically described here. For example, LiDAR system 800 may include a communications block (not shown) configured to enable communication between LiDAR system 800 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 800 is described with reference to particular blocks (e.g., threshold control block 880), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 800 may be combined with or operated by other sub-systems as informed by design. For example, power management block 815 and/or threshold control block 880 may be integrated with processor(s) 820 instead of functioning as separate entities.

Example Computer Systems Implementing Aspects of Embodiments Herein

Figure 9:
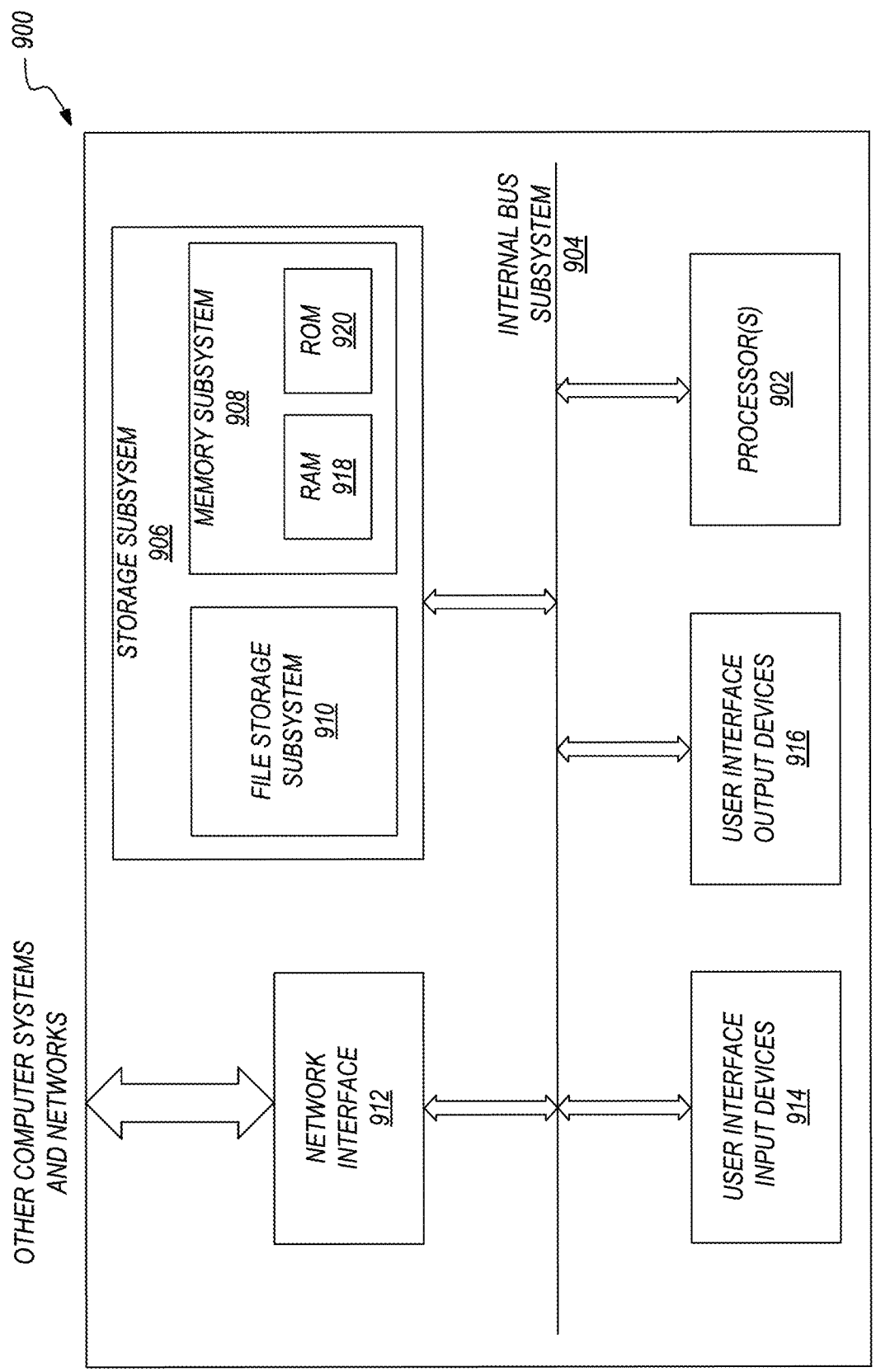
FIG. 9 illustrates an example computer system that may be utilized to implement techniques disclosed herein, according to certain embodiments of the invention.

FIG. 9 is a simplified block diagram of computer system 900 configured to operate aspects of a LiDAR-based detection system, according to certain embodiments. Computer system 900 can be used to implement any of the systems and modules discussed above with respect to FIGS. 1-6. For example, computer system 900 may operate aspects of threshold control 880, TOF module 834, processor(s) 820, control system 840, or any other element of LiDAR system 800 or other system described herein. Computer system 900 can include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computer system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. The memory system can contain a look-up table providing the wavelength corresponding to a detected termperature of the laser diode.

It should be appreciated that computer system 900 is illustrative and not intended to limit embodiments of the present disclosure. Many other configurations having more or fewer components than system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets)

or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single laser to illuminate the array of MEMS mirrors, an array of mirrors may be used. Also, the pattern generation and decoding could be hard-wired, in firmware or in software in different embodiments.

The MEMS-based WSS structure of the present invention can be used in a variety of other applications than LIDAR. Light beam steering techniques can also be used in other optical systems, such as optical display systems (e.g., TVs), optical sensing systems, optical imaging systems, and the like. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The MEMS mirror structure of the present invention can have the mirror mass driven by different types of actuators. In some light steering systems, the transmitted or received light beam may be steered by an array of micro-mirrors. Each micro-mirror may rotate around a pivot or connection point to deflect light incident on the micro-mirror to desired directions. The performance of the micro-mirrors may directly affect the performance of the light steering system, such as the field of view (FOV), the quality of the point cloud, and the quality of the image generated using a light steering system. For example, to increase the detection range and the FOV of a LiDAR system, micro-mirrors with large rotation angles and large apertures may be used, which may cause an increase in the maximum displacement and the moment of inertia of the micro-mirrors. To achieve a high resolution, a device with a high resonant frequency may be used, which may be achieved using a rotating structure with a high stiffness. It may be difficult to achieve this desired performance using electrostatic actuated micro-mirrors because comb fingers used in an electrostatic-actuated micro-mirror may not be able to provide the force and moment needed and may disengage at large rotation angles, in particular, when the aperture of the micro-mirror is increased to improve the detection range. Some piezoelectric actuators may be used to achieve large displacements and large scanning angles due to their ability to provide a substantially larger drive force than electrostatic-actuated types, with a relatively lower voltage.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. A micro-electromechanical system (MEMS) apparatus for beam steering in a Light Detection and Ranging (LiDAR) system of an autonomous vehicle, the apparatus comprising:
   a laser diode emitting a laser beam;
   a laser beam wavelength detector;
   a MEMS-based Wavelength Selectable Switch (WSS), controllable to provide a selected wavelength band to an output of the WSS;
   a light condenser for directing reflected light from the laser diode to an input of the MEMS-based Wavelength Selectable Switch;
   at least one detector for detecting the selected wavelength band from the output of the WSS; and
   a controller configured to control the WSS to select the selected wavelength band based on a detected wavelength from the laser beam wavelength detector,
   wherein the selected wavelength band of the WSS is 25 nanometers or less,
   wherein the WSS includes a reflective MEMS mirror array, an optical circulator, a grating, a single input and a plurality of outputs, the optical circulator is connected to a fiber cable which receives reflected light from the light condenser and the optical circulator provides the reflected light to the WSS and receives back the selected wavelength band from the WSS and provides the selected wavelength band to the detector.

2. The apparatus of claim 1 wherein the WSS is a transmissive WSS.

3. The apparatus of claim 1 wherein the laser beam wavelength detector comprises a thermistor.

4. The apparatus of claim 1 further comprising:
a heater mounted proximate to the laser diode;
a thermistor mounted proximate to the laser diode;
the controller being coupled to the heater to cause the heater to maintain a temperature output of the thermistor to above a designated temperature level that will maintain the wavelength of the laser beam within the selected wavelength band;
wherein the controller provides a varying voltage level to the heater to maintain the temperature output of the thermistor to above the designated temperature level; and
wherein the heater comprises at least one resistor.

5. The apparatus of claim 4 wherein the heater comprises at least one resistor.

6. The apparatus of claim 1 further comprising:
additional outputs of the WSS connected to a black light dump; and
the controller being configured to control the WSS to select wavelengths other than the selected wavelength band to be directed to the additional outputs.

* * * * *